(12) United States Patent
Plowman (10) Patent No.: US 8,844,344 B2
(45) Date of Patent: Sep. 30, 2014

(54) GEARBOX TEST RIG

(71) Applicant: MacTaggart Scott (Holdings) Limited, Midlothian (GB)

(72) Inventor: Alistair Plowman, Midlothian (GB)

(73) Assignee: MacTaggart Scott (Holdings) Limited, Loanhead (GB)

( * ) Notice: Subject to any disclaimer, the term of this patent is extended or adjusted under 35 U.S.C. 154(b) by 0 days.

(21) Appl. No.: 13/870,294

(22) Filed: Apr. 25, 2013

(65) Prior Publication Data

US 2013/0283899 A1  Oct. 31, 2013

(30) Foreign Application Priority Data

Apr. 25, 2012  (GB) .................................. 1207263.3

(51) Int. Cl.
*G01M 13/02* (2006.01)
(52) U.S. Cl.
CPC .................................. *G01M 13/021* (2013.01); *G01M 13/026* (2013.01)
USPC ........................................ 73/115.02; 73/162
(58) Field of Classification Search
USPC .............................................. 73/115.02, 162
See application file for complete search history.

(56) References Cited

U.S. PATENT DOCUMENTS

| | | | |
|---|---|---|---|
| 2,157,903 A * | 5/1939 | Lapsley | 73/814 |
| 2,371,607 A * | 3/1945 | Collins | 464/26 |
| 2,712,756 A * | 7/1955 | Greer et al. | 73/814 |
| 2,935,869 A | 5/1960 | Shipley | |
| 3,078,711 A * | 2/1963 | Shutt | 73/162 |
| 3,195,350 A * | 7/1965 | Reed | 73/162 |
| 4,004,498 A | 1/1977 | Aoki | |
| 4,274,278 A * | 6/1981 | Patterson | 73/7 |
| 4,501,139 A * | 2/1985 | Petersen | 73/117.01 |
| 4,578,993 A * | 4/1986 | Burandt | 73/162 |
| 4,601,198 A | 7/1986 | Kolitsch | |
| 5,113,704 A * | 5/1992 | Yano et al. | 73/162 |

(Continued)

FOREIGN PATENT DOCUMENTS

| | | |
|---|---|---|
| CN | 201688969 | 12/2010 |
| CN | 101957260 | 1/2011 |

(Continued)

OTHER PUBLICATIONS

Search Report for GB 1207263.3 dated Jul. 23, 2012.

(Continued)

*Primary Examiner* — Freddie Kirkland, III
(74) *Attorney, Agent, or Firm* — Nixon & Vanderhye P.C.

(57) ABSTRACT

A gearbox test rig is provided for testing first and/or second gearboxes having power ratings of 1 MW or more. The gearbox test rig comprises a first coupler for coupling a low-speed shaft of a first gearbox to a low-speed shaft of a second gearbox such that forces can be transmitted between the low-speed shafts of the first and second gearboxes. The gearbox test rig further comprises a second coupler for coupling a high-speed shaft of the first gearbox to a high-speed shaft of the second gearbox such that forces can be transmitted between the high-speed shafts of the first and second gearboxes, wherein the second coupler comprises a hydraulic rotary actuator for regulating a torque which is applied to the high-speed shafts of the first and second gearboxes. Such a gearbox test rig is particularly useful for testing heavy duty gearboxes, such as those used in wind turbines.

34 Claims, 6 Drawing Sheets

(56) References Cited

U.S. PATENT DOCUMENTS

| | | |
|---|---|---|
| 5,440,970 A | 8/1995 | Tonsor |
| 5,632,191 A | 5/1997 | Lemaire et al. |
| 6,047,596 A * | 4/2000 | Krug et al. .................. 73/162 |

FOREIGN PATENT DOCUMENTS

| | | |
|---|---|---|
| DE | 3100848 | 8/1982 |
| DE | 19704016 | 8/1998 |
| EP | 2 452 846 | 5/2012 |
| SU | 1250871 | 8/1986 |

OTHER PUBLICATIONS

A. Mihailidis et al., "A New System for Testing Gears Under Variable Torque and Speed", Recent Patents on Mechanical Engineering 2009, 2009, vol. 2, No. 3, pp. 179-192.

* cited by examiner

GEARBOX TEST RIG

CROSS REFERENCE TO RELATED APPLICATION

This application claims the benefit of the disclosure of Patent Application No. GB 1207263.3 filed on Apr. 25, 2012, which is hereby incorporated herein by reference

FIELD OF THE INVENTION

The invention relates to a gearbox test rig and a method of testing first and/or second gearboxes.

BACKGROUND TO THE INVENTION

Wind turbines are often deployed in remote locations such as on hilltops or offshore. As such, gaining access to the wind turbines for repair purposes is typically expensive. To mitigate the risk of having to repair wind turbines early in their working lifetime, it is necessary to rigorously test the components of each wind turbine before installation. One such component is the gearbox used to convert relatively low-speed, high torque movements of the turbine blades to the higher-speed, lower torque movements required by an electricity generator.

Gearboxes intended for use in wind turbines typically require dedicated test rigs. The simplest form of test rig is an open loop test rig comprising a drive motor for applying a low-speed, high torque signal to a low-speed shaft of the gearbox being tested to simulate the movement of the wind turbine blades. Measurements can be performed on the low-speed and corresponding high-speed shafts of the gearbox to test its performance. However, the energy input by the drive motor must be dissipated constantly by means of, for example, a braking device which must be kept cool. As such, open loop test rigs are inefficient.

A more efficient, closed-loop gearbox is described in DE19704016. In this case, the respective low and high speed shafts of two gearboxes are coupled to each other, via additional gearboxes. One of the said two gearboxes is a summing gearbox comprising a third shaft to which the main load torque is applied. An electric motor is also provided to overcome losses due to mechanical friction in the system. By coupling together the respective shafts of the gearboxes, a closed-loop mechanical circuit is formed whereby energy input to the test rig can be recycled. However, the "third shaft" of the summing gearbox is typically the casing of the summing gearbox. Rotating the casing of the gearbox would typically be impractical and inefficient, particularly for a heavy duty wind turbine gearbox, due to the large amount of energy which would be required. In addition, the high energy requirements would make it difficult to test the gearbox for transient loads.

A further restriction of the test rig of DE19704016 is that the overall transmission ratio of all the gearboxes on the path from the output shaft to the input shaft of the gearbox being tested must be equal to that of the gearbox being tested.

It would thus be desirable to provide a new gearbox test rig design which overcomes the above mentioned problems.

SUMMARY OF THE INVENTION

According to a first aspect of the invention there is provided a gearbox test rig for testing first and/or second gearboxes, the gearbox test rig comprising: a first coupler for coupling a low-speed shaft of a first gearbox to a low-speed shaft of a second gearbox such that forces can be transmitted between the low-speed shafts of the first and second gearboxes; and a second coupler for coupling a high-speed shaft of the first gearbox to a high-speed shaft of the second gearbox such that forces can be transmitted between the high-speed shafts of the first and second gearboxes, wherein the second coupler comprises a hydraulic rotary actuator for regulating a torque which is applied to the high-speed shafts of the first and second gearboxes.

It will be understood that the terms "low-speed shaft" and "high-speed shaft" (and indeed "low-speed" and "high-speed") are relative terms. That is, each of the first and second gearboxes comprises a low-speed shaft geared to a high-speed shaft, the low-speed shaft rotating at a slower rotational speed than the high-speed shaft in response to rotation of either shaft.

Typically, the first coupler is capable of transmitting rotational forces between the low-speed shafts and the second coupler is capable of transmitting rotational forces between the high-speed shafts.

By coupling the respective low-speed and high-speed shafts of the gearboxes together, a closed-loop mechanical circuit is created which allows energy input to the system to be recycled. In addition, by regulating the torque at the high-speed shafts (rather than the low-speed shafts) of the first and second gearboxes, a smaller, more economical and physically manageable actuator can be employed. Thus, the first aspect of the invention provides a relatively inexpensive, energy efficient gearbox test rig which makes efficient use of space. In addition, the hydraulic rotary actuator in the second coupler provides an effective means for applying transient torques to the gearboxes. This means that no additional components or drive mechanisms are required in order to test the response(s) of gearbox(es) to transient torques.

Typically, the hydraulic rotary actuator is a hydraulic motor. By a hydraulic motor we include a hydraulic pump-motor capable of operating as both a hydraulic motor and a hydraulic pump. However, the hydraulic rotary actuator may in some embodiments be a hydraulic pump, for example if it is required to provide only a resistive torque.

In one embodiment, the torque which is applied to the high-speed shafts of the first and second gearboxes may be regulated by regulating the pressure of a hydraulic fluid introduced to the actuator.

Because hydraulic rotary actuators generate less noise than mechanical actuators, noise measurements can be performed on the gearbox(es) being tested without having to account for significant noise interference from the actuator.

In some cases, the first and second gearboxes may have different gear ratios which results in the high-speed shafts of the first and second gearboxes rotating at different rates. This may result simply from minor variations arising from manufacturing tolerances or the differences in gear ratios may be more substantial. Typically, hydraulic rotary actuators allow "slippage" (i.e. relative rotation) of the high-speed shaft of the first gearbox relative to the high-speed shaft of the second gearbox. This allows the high-speed shafts of the first and second gearboxes to be coupled together, and for forces to be transmitted between them, even when they are rotating at different rates. This significantly improves the adaptability of the gearbox test rig because it allows the first and second gearboxes to have different gearing ratios.

To permit slippage, the hydraulic rotary actuator typically comprises first and second members (such as a shaft and a casing) which are rotatable relative to each other, each member being couplable or coupled to a high-speed shaft of a respective one of the first and second gearboxes.

Preferably, the first member is fully rotatable relative to the second member about an axis of rotation such that the high-speed shaft of the first gearbox is fully rotatable relative to the high-speed shaft of the second gearbox about said axis of rotation. The first member preferably has an unlimited range of rotational movement about the axis of rotation relative to the second member to provide the high-speed shaft of the first gearbox with an unlimited range of rotational movement about said axis of rotation relative to the high-speed shaft of the second gearbox.

In one embodiment of the gearbox test rig according to the first aspect of the invention, the first member comprises an actuator shaft provided within an actuator casing. In this case, it is preferable that the second member comprises the actuator casing.

As indicated above, relative rotation of the high-speed shafts allows the first and second gearboxes to be provided with different gearing ratios which improves the adaptability of the gearbox test rig, because it is not necessary to employ first and second gearboxes having identical gearing ratios (which would not always be convenient). This also helps to improve procedural efficiency when, for example, multiple gearboxes need to be tested on the same rig (e.g. the test rig may be used to test consecutive gearboxes produced on a production line). This is because only one gearbox (the one being tested) may need to be changed at a time.

Preferably, the gearbox test rig according to the first aspect of the invention further comprises one or more torque sensors for measuring the torque being applied to one or more of the shafts of the first and/or second gearboxes. By providing torque sensors, the amount of combined torque being applied to the one or more shafts of the first and/or second gearboxes by the actuator and the closed-loop mechanical circuit can be determined.

Preferably, the gearbox test rig further comprises a controller for controlling the torque applied to the high-speed shafts of the first and second gearboxes by the hydraulic rotary actuator. Such a controller allows an operator of the gearbox test rig to control the torque being applied to the high-speed shafts of the first and second gearboxes. Preferably, the controller is PC-based so as to provide an intuitive user interface to the operator of the test rig.

In one embodiment, where one or more torque sensors and a controller are provided, the one or more torque sensors may be (typically electronically) coupled to the controller. In this case, the torque sensors provide (typically electronic) feedback signals to the controller to provide measurements of the torque being applied to one or more shafts of the first and second gearboxes. Preferably the controller has a first operating mode wherein it is capable of controlling the hydraulic rotary actuator to apply a substantially constant torque to the high-speed shaft of the first and second gearboxes. The measurement data fed back to the controller by the one or more torque sensors helps the controller to regulate the torque applied to the high-speed shafts of the first and second gearboxes.

Preferably, the controller has a second operating mode whereby it is capable of controlling the hydraulic rotary actuator to apply one or more transient torques to the high-speed shafts of the first and second gearboxes.

In one embodiment, the gearbox test rig according to the first aspect of the invention further comprises one or more gears couplable or coupled between the high-speed shaft of the first gearbox and the hydraulic rotary actuator and/or one or more gears couplable or coupled between the high-speed shaft of the second gearbox and the hydraulic rotary actuator. Where the first and second gearboxes have different gearing ratios, the high-speed shafts of the first and second gearboxes may rotate at different rates. In this case, as well as supplying the torque, the hydraulic actuator may be required to make up for the difference in rates of rotation of the high-speed shafts of the first and second gearboxes. With increasing drive speed, the power required from the actuator also increases. By coupling one or more gears between the high-speed shaft(s) of the first and/or second gearboxes and the hydraulic rotary actuator, the power required from the actuator is reduced.

Preferably, the gearbox test rig according to the first aspect of the invention further comprises a drive motor coupled to the first coupler such that forces can be transmitted from the drive motor to the low-speed shafts of the first and second gearboxes. The drive motor typically controls the speed of the rotation of the low-speed shafts of the first and second gearboxes, typically via one or more drive gears. The drive motor may control the speed of rotation of the low-speed shafts so as to vary the speed of rotation of the low-speed shafts to simulate the variable speed of rotating turbine blades—e.g. to simulate the speed of rotation of turbine blades varying as a blade passes the tower of a wind turbine generator or due to the response times of blade pitch/stall control.

Torque simulation may be achieved using only the hydraulic rotary actuator. After the drive motor has brought the gearbox shafts up to the required speed, it may be required only to overcome inefficiencies (e.g. frictional energy losses in the gearboxes) in the closed-loop mechanical circuit.

The drive motor may be electrically powered, but more preferably the drive motor is hydraulically powered.

Preferably, the gearbox test rig is suitable for testing first and/or second gearboxes having a mass of 10 tonnes or more.

Preferably, the gearbox test rig is suitable for testing first and/or second gearboxes having power ratings of 1 MW or more.

Preferably, the gearbox test rig is suitable for testing first and/or second gearboxes having low-speed shafts capable of reacting torques of 1000000 Nm or more.

Preferably, the gearbox test rig is suitable for testing first and/or second gearboxes having high-speed shafts capable of reacting torques of 10000 Nm or more.

Such gearboxes include wind turbine gearboxes. Due to the large scale of wind turbine gear boxes, it is typically necessary to use a secondary wind turbine gear box to complete the closed-loop mechanical circuit in the absence of other suitable machines. Both wind turbine gear boxes may be tested together; alternatively, one of the first and second gearboxes may be used as a reference for the other being tested.

The gearbox test rig may also be employed to test other large-scale gearboxes, such as aircraft gearboxes.

The first coupler may comprise a mechanical coupler; additionally or alternatively, the first coupler may comprise a hydraulic coupler.

Preferably, the first and/or second gearboxes are fixedly connected to a test rig bedplate. The test rig bed plate is typically designed to absorb the full torques of all test operations.

In one embodiment, the second coupler comprises a drive belt. The drive belt helps to transmit forces between the high-speed shafts of the first and second gearboxes.

In one embodiment, the second coupler comprises first and second drive belts. In this case, the first and second drive belts may help to transmit forces between the high speed shafts of the first and second gearboxes.

The first drive belt may couple the hydraulic rotary actuator to a rotatable mechanical shaft. Where two drive belts are provided, the second drive belt may couple the high speed shaft of the first or second gearbox to a rotatable mechanical shaft. The rotatable mechanical shaft to which the second drive belt couples the high speed shaft of the first or second gearbox may be the same rotatable mechanical shaft to which the first drive belt couples the hydraulic rotary actuator; alternatively, the rotatable mechanical shafts may be different. Where the rotatable mechanical shafts are different, they are preferably coupled together such that when one of the rotatable mechanical shafts rotates, the other rotates with it.

Preferably, the hydraulic rotary actuator comprises a motor (or is capable of operating as a motor) capable of providing torques in each of two opposing rotational directions about a common axis of rotation.

As indicated above, preferably the hydraulic rotary actuator provides the high-speed shaft of the first gearbox with an unlimited range of rotational movement about an axis of rotation relative to the high-speed shaft of the second gearbox. For example, the hydraulic rotary actuator may be a radial piston hydraulic rotary actuator. When the first and second gearboxes have matching gearing ratios, a wider range of hydraulic rotary actuators may be employed.

According to a second aspect of the invention, there is provided a method of testing first and/or second gearboxes, the method comprising: coupling a low-speed shaft of a first gearbox to a low-speed shaft of a second gearbox by a first coupler; coupling a high-speed shaft of a first gearbox to a high-speed shaft of a second gearbox by a second coupler, the second coupler comprising a hydraulic rotary actuator; transmitting forces between the low-speed shafts of the first and second gearboxes by the first coupler; transmitting forces between the high-speed shafts of the first and second gearboxes by the second coupler; and controlling the hydraulic rotary actuator to regulate a torque which is applied to the high-speed shafts of the first and second gearboxes.

The forces transmitted between the low-speed shafts and between the high-speed shafts are typically rotational forces.

The method may further comprise performing one or more tests on the first and/or second gearboxes. Such tests may include, for example but not exclusively, noise testing, power, torque or speed testing, and/or testing of oil cleanliness.

Typically, the hydraulic rotary actuator comprises first and second members, the first member being rotatable relative to the second member, the method further comprising coupling the high-speed shaft of one of the first and second gearboxes to the first member and coupling the high-speed shaft of the other of the first and second gearboxes to the second member. Preferably, the first member is an actuator shaft of the hydraulic rotary actuator. Preferably, second member is a casing of the hydraulic rotary actuator.

Particularly when the first and second gearboxes do not have matching gearing ratios, the high-speed shafts of the first and second gearboxes may rotate at different rates. Accordingly, the method may further comprise rotating the first member relative to the second member, in order to allow the high-speed shafts of the first and second gearboxes to rotate at different rates. This allows gearboxes with non-matching gearing ratios to be tested together on the test rig.

In one embodiment of the method according to the second aspect of the invention, the method may further comprise controlling the hydraulic rotary actuator to apply a substantially constant torque to the high-speed shafts of the first and second gearboxes. The response of the first and/or second gearboxes to the application of a constant torque may be one of several tests to be performed on the gearbox.

Additionally or alternatively, the method may further comprise controlling the hydraulic rotary actuator to apply one or more transient torques to the high-speed shafts of the first and second gearboxes. The response of the first and/or second gearboxes to the application of transient torques may be one of several tests to be performed on the gearbox.

In one embodiment, the method may further comprise coupling the high speed shaft(s) of the first and/or second gearboxes to the hydraulic rotary actuator via one or more gears. This is a useful step if, for example, the gearing ratios of the first and second gearboxes are significantly different, and the high-speed shafts are coupled to respective first and second members of the hydraulic rotary actuator, the first and second members being rotatable relative to each other. This is because the one or more gears between the high-speed shaft(s) of the first and/or second gearboxes and the hydraulic actuator may help to substantially equalize the required rates of rotation of the first and second members of the hydraulic rotary actuator to which the high-speed shafts are coupled. This can significantly decrease the power requirements of the hydraulic rotary actuator because it no longer needs to overcome such significant differences in rotational speed of the high-speed shafts.

Preferably, the method further comprises transmitting a torque from a drive motor to the low-speed shafts of the first and second gearboxes via the first coupler. The drive motor may supply sufficient energy to overcome energy losses in the closed-loop mechanical circuit, such as frictional losses in the gearboxes.

As discussed above, the drive motor may be electrically powered, but more preferably the drive motor is hydraulically powered.

The first coupler may comprise a mechanical coupler. Additionally or alternatively, the first coupler may comprise a hydraulic coupler.

In one embodiment, the second coupler comprises one or more drive belts, the method further comprising transmitting forces between the high-speed shafts of the first and second gearboxes via the one or more drive belts.

Drive belts have been found to be a particularly efficient way of transmitting forces between the high-speed shafts of the first and second gearboxes.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
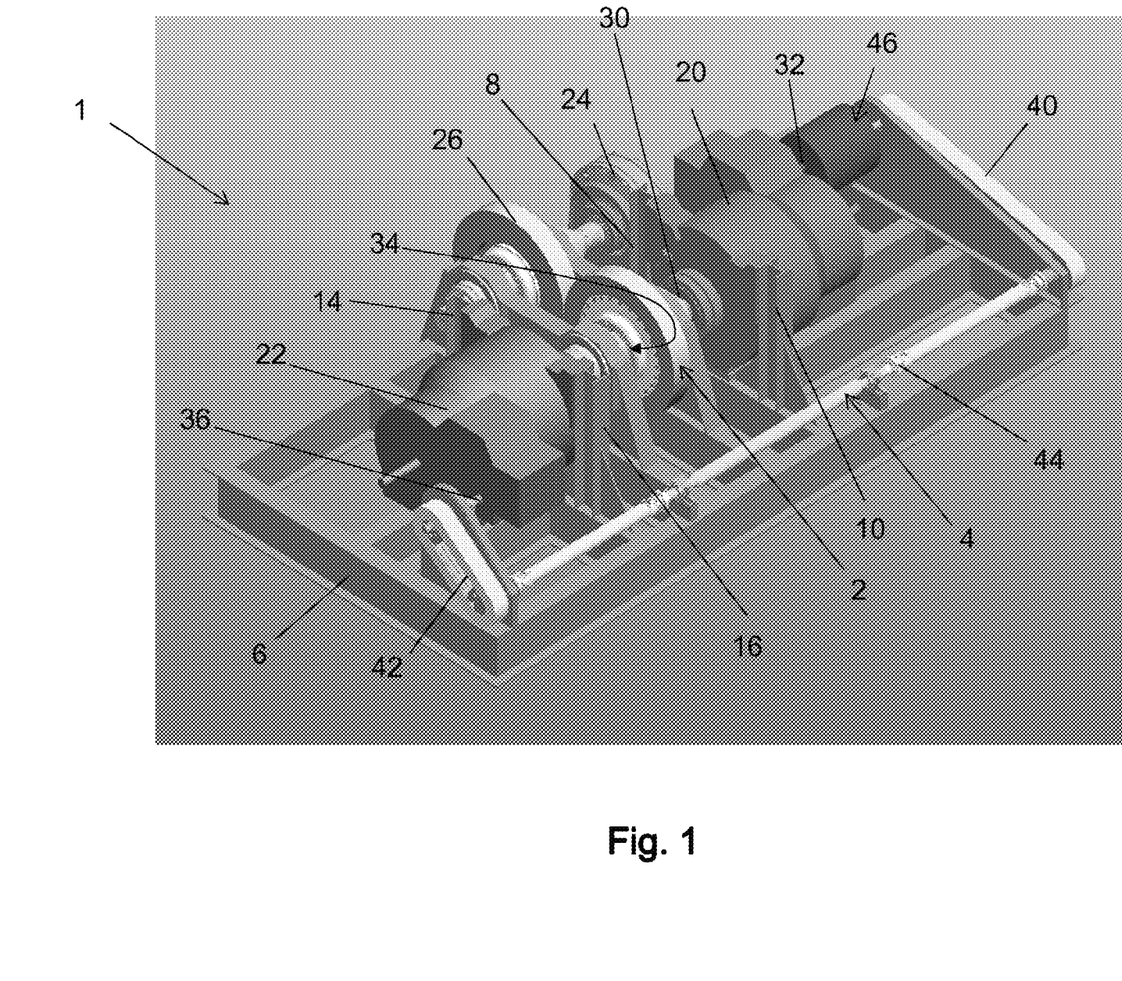
FIG. 1 is a perspective view of first and second gearboxes mounted to a gearbox test rig.
Figure 2:
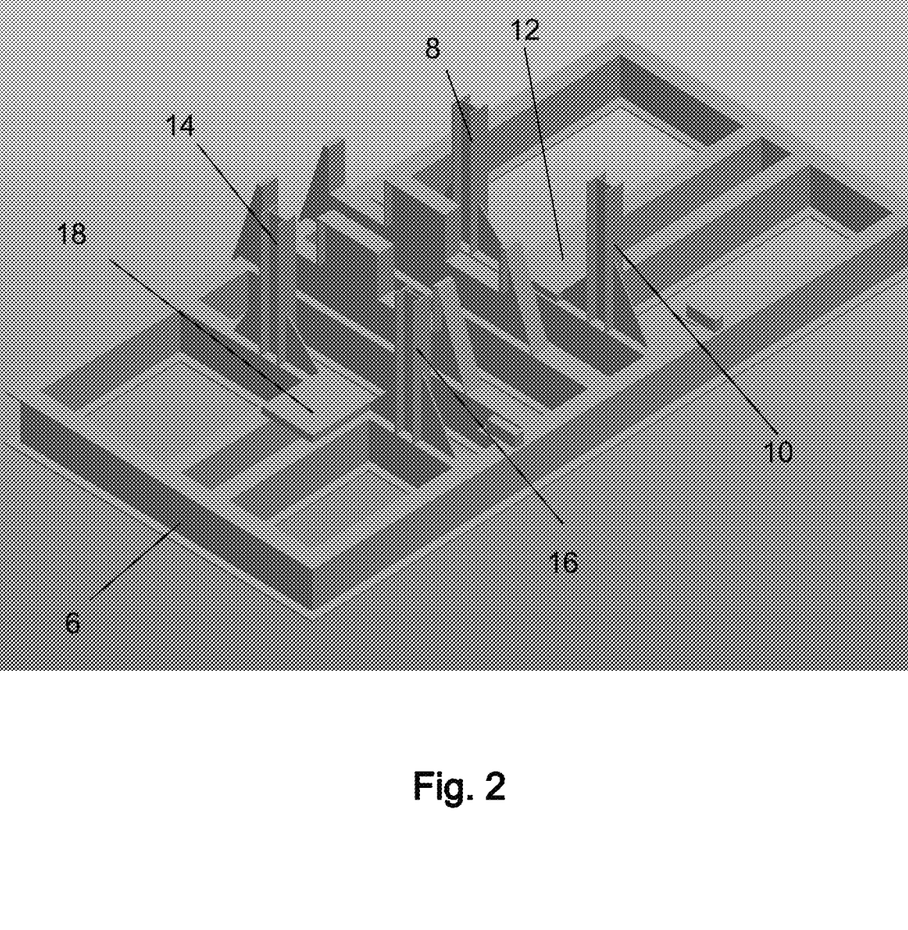
FIG. 2 is a perspective view of the bedplate of the gearbox test rig illustrated in FIG. 1.
Figure 3:
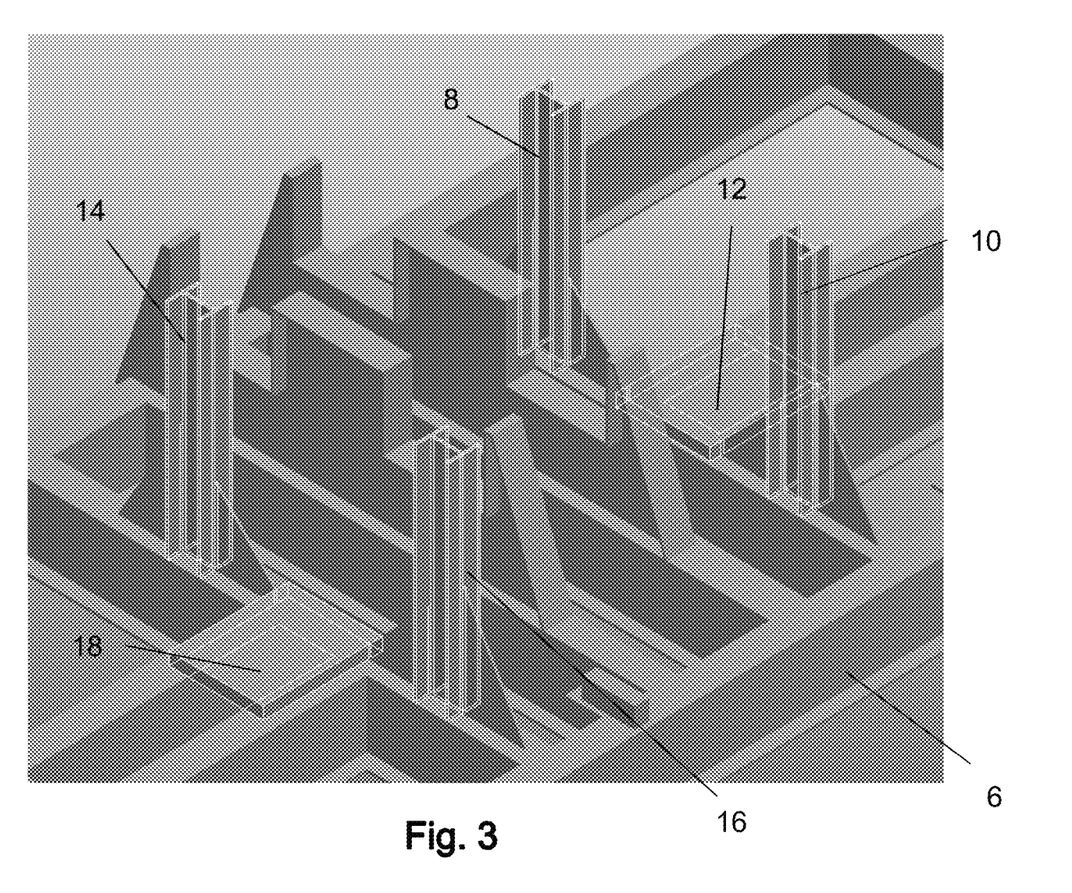
FIG. 3 is a close-up perspective view of possible gearbox mounting points of the bedplate of FIG. 2.

FIG. 1 is a perspective view of a gearbox test rig 1 comprising first and second couplers 2, 4 secured to a bedplate 6 comprising gearbox mounting points 8-18 (see FIGS. 2, 3). The bedplate 6 is secured to a foundation (not shown); for example the foundation may be a concrete floor and the bedplate may be secured to the foundation by bolts (e.g. rawl bolts, resin anchors or other suitable bolting systems). A first gearbox 20 is mounted to gearbox mounting points 8-12 and a second gearbox 22 is mounted to gearbox mounting points 14-18. The gearbox mounting points 8-18 are arranged such that the gearboxes 20, 22 are configured back-to-back and with their axes at 0° to the horizontal. Vibration damping bushes (not shown) may optionally be provided between the gearbox mounting points 8-18 and the respective gearboxes 20, 22 to dampen vibrations of the gearboxes 20, 22 before they are transmitted to the bedplate 6. Optional mounting assemblies may be provided to account for variation in vertical/horizontal offset and depth of each gearbox to be tested. The gearbox test rig 1 further comprises a low speed, high displacement drive motor 24 mechanically coupled to the first coupler 2 via a drive gear 26 to simulate the rotor assembly within a wind turbine. The drive motor 24 may be any suitable motor such as an electric motor or a hydraulic motor, but most preferably the drive motor 24 is a hydraulic motor because hydraulic motors are more suitable for applying the required low-speed, high-torque rotation to the drive gear 26.

The bedplate 6 is typically designed to react the full torque of all test operations through the gearbox mounting points 8-18. As such, only a lightweight holding down arrangement is required to secure the bedplate 6 to the foundation.

The first gearbox 20 comprises a low-speed shaft 30 geared to a high-speed shaft 32 by a first gearbox gearing ratio. The second gearbox 22 comprises a low-speed shaft 34 geared to a high-speed shaft 36 by a second gearbox gearing ratio. The low-speed shafts 30, 34 of the first and second gearboxes 20, 22 are coupled together by the first coupler 2 such that (typically rotational) forces can be transmitted between them. The first coupler 2 is typically a mechanical coupler comprising a low-speed rotatable synchronising shaft. However, the first coupler 2 may additionally or alternatively comprise a hydraulic coupler.

Figure 4:
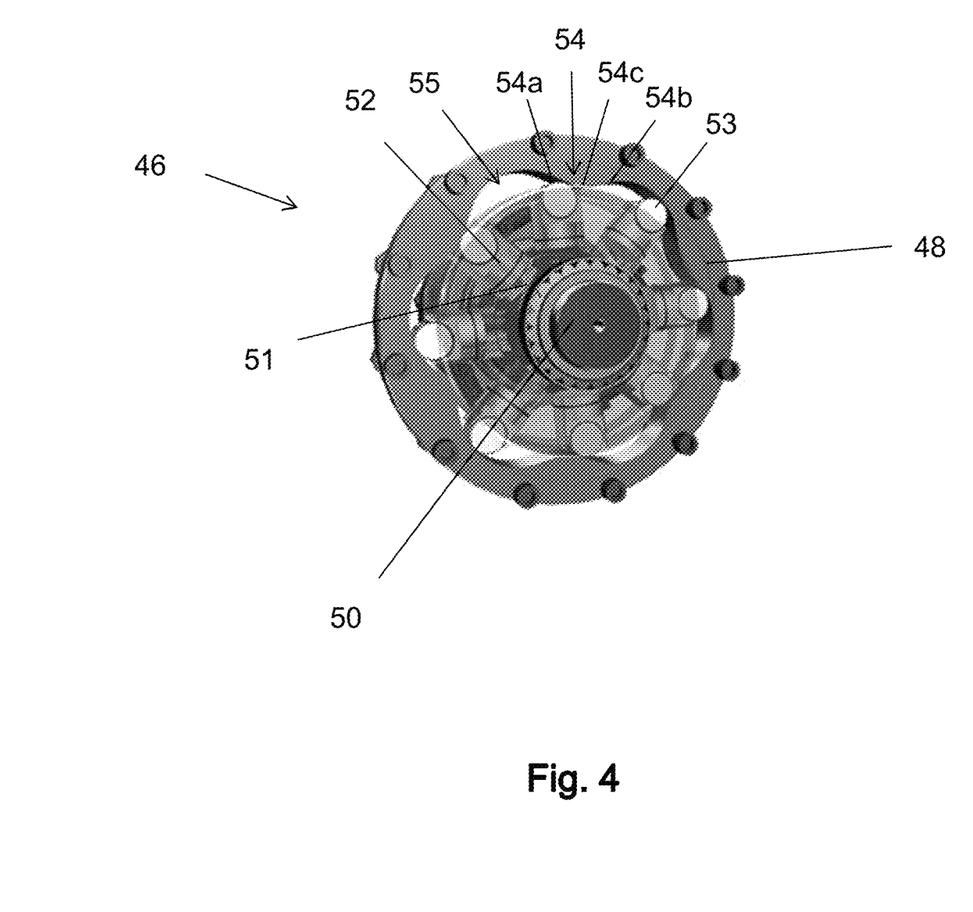
FIG. 4 is a perspective view of an exemplary radial piston hydraulic actuator for the gearbox test rig shown in FIG. 1.

The high-speed shafts 32, 36 of the first and second gearboxes 20, 22 are also coupled together by the second coupler 4 such that (typically rotational) forces can be transmitted between them. The second coupler 4 is typically a mechanical coupler comprising first and second drive belts 40, 42 and a high-speed rotatable synchronising shaft 44, but may be any suitable coupler. The second coupler 4 also comprises a hydraulic rotary actuator 46 between the high-speed shaft 32 of the first gearbox 20 and the first drive belt 40. A perspective view of an exemplary hydraulic rotary actuator (in this case a radial piston hydraulic actuator) is shown in FIG. 4.

Radial piston rotary actuator 46 comprises a substantially cylindrical actuator casing 48 and a cylindrical actuator shaft 50 rotatably mounted within (and typically concentric with) the actuator casing 48. A plurality of pistons 51 are provided, each of which is reciprocally mounted within a corresponding cylinder 52 extending radially (with respect to the shaft 50) between the shaft 50 and the casing 48. Each piston 51 comprises a roller 53 which is engageable with an inner surface of the casing 48. The pistons 51 and cylinders 52 are fixedly coupled to an outer surface of the shaft 50 so that they rotate with the shaft 50 (and so that they can rotate relative to the casing 48). The casing 48 comprises alternate radial projections 54 and recesses 55 arranged around its inner surface. The projections 54 comprise inclined portions 54a, 54b (in this exemplary embodiment the projections are rounded) converging towards each other on either side of a crest 54c.

Each cylinder 52 is in fluid communication with a hydraulic power unit (not shown) via high pressure (preferably flexible) hoses to create a hydraulic circuit. When pressurised hydraulic fluid is input to one of the cylinders 52 from the hydraulic power unit, the fluid applies a biasing force to the corresponding piston roller 53 against the inner surface of the casing 48. A corresponding reaction force is applied to the roller 53 by the inner surface of the casing 48. If the piston roller 53 is aligned with an inclined portion 54a, 54b of one of the projections 54, the reaction force applies a tangential force to the piston roller 53 which is transmitted as a torque to the actuator shaft 50 via the hydraulic fluid within the cylinder. By selectively controlling the pressure of hydraulic fluid within the cylinders 52, a torque of desired magnitude and direction can be exerted on the shaft 50. It will be understood that more than one cylinder may be activated (by providing pressurised hydraulic fluid) at any given time to apply the desired torque.

The torque applied by the radial piston hydraulic rotary actuator 46 is typically reversible by applying a biasing force to the other of the inclined portions 54a, 54b of the appropriately selected projections 54.

The first drive belt 40 is rotatably coupled to the high-speed rotatable synchronising shaft 44 at one end and to the actuator casing 48 at another end opposite said one end (optionally via an additional rotatable coupling shaft). The second drive belt 42 is rotatably coupled at one end to the high-speed rotatable synchronising shaft 44 and at another end opposite said one end to the high-speed shaft 36 of the second gearbox 22.

Typically, the high-speed shaft 32 of the first gearbox 20 is directly connected to the actuator shaft 50, while the high-speed shaft 36 of the second gearbox 22 is coupled to the actuator casing 48 of the actuator 46 via the second drive belt 42, the high-speed rotatable synchronising shaft 44 and the first drive belt 40. The description below assumes that this arrangement is employed. However, in an alternative embodiment, the high-speed shaft 32 of the first gearbox 20 may be connected directly to the actuator casing 48 of the hydraulic rotary actuator 46, while the high-speed shaft 36 of the second gearbox may be coupled to the actuator shaft 50 of the hydraulic rotary actuator via the drive belts 40, 42 and high speed synchronising shaft 44.

By coupling the respective low-speed and high-speed shafts of the first and second gearboxes together, a closed-loop mechanical circuit is created whereby energy can be recycled. This is illustrated by the block diagram of FIG. 5. Because of the positive feedback created by the closed-loop mechanical circuit, the power required from the drive motor 24 is limited to overcoming energy losses in the closed-loop mechanical circuit such as frictional losses in the gearboxes 20, 22. However, it will be understood that the drive motor 24 is required to be capable of overcoming the energy losses incurred in the circuit at all desired rates of rotation of the high-speed shaft(s) 32, 36 of the first and/or second gearboxes 20, 22.

In order to protect them from torque overload, the first and second couplers 2, 4 may be provided with torque-limited couplings which are designed to fail before the gearbox is damaged. Thus, in the event of a higher than desired torque being applied, the first and/or second couplers 2, 4 may fail, disabling the positive feedback between the input and output shafts of the gearboxes 20, 22. This prevents damage to the gearboxes 20, 22 from torque overload.

Safety guards may be provided around the gearbox test rig 1 to contain any debris or oil splashes from the rig. If required, the high speed shaft(s) of the first and/or second gearboxes 20, 22 and some or all of the second coupler 4 may be routed underneath the bedplate as an extra safety measure.

The gearbox test rig 1 may be employed to test the first or second gearboxes 20, 22 individually, the other gearbox being employed to complete the closed loop mechanical circuit which helps to optimise the energy efficiency of the test rig. Because wind turbine gearboxes are typically heavy duty, high power devices (typically the gearbox test rig 1 is suitable for testing first and/or second gearboxes having power ratings of 1 MW or more, for example the gearbox test rig 1 may be suitable for testing first and/or second gearboxes having power ratings of 2 MW; in another example, the gearbox test rig 1 may be suitable for testing first and/or second gearboxes having power ratings of 5 MW), a second gearbox built to the same specification from the same product line is typically the most readily available tool suitable for transmitting recycled energy around the closed loop mechanical circuit.

Alternatively, the gearbox test rig 1 may be employed to test the first and second gearboxes 20, 22 simultaneously. For simplicity, in the description below, it is assumed that the first gearbox 20 is being tested individually, but it will be understood that the apparatus could be readily adapted for testing the first and second gearboxes 20, 22 simultaneously (or for testing the second gearbox individually).

To perform torque, power and/or speed testing of the first gearbox 20, the drive motor 24 is typically energised to apply a relatively high torque, low-speed rotation to the low-speed shafts 30, 34 of the first and second gearboxes 20, 22 via drive gear 26. This high-torque, low speed rotation simulates the rotation intended to be conferred on the low-speed shafts of the gearboxes by wind turbine blades when the gearbox is being used. When the first and second gearboxes 20, 22 are matched, i.e. if the first gearbox gearing ratio is substantially identical to the second gearbox gearing ratio, the high-speed shafts 32, 36 of the first and second gearboxes 20, 22 rotate at the same rate in response to the drive motor 24 (via the drive gear 26). In this case, the high-speed shafts 32, 36 of the first and second gearboxes 20, 22 drive the drive belts 40, 42 and the synchronising shaft 44 of the second coupler 4 at substantially the same rates of rotation.

In order to regulate the torque being applied to the high-speed shafts 32, 36 of the first and second gearboxes 20, 22, the hydraulic rotary actuator 46 can be energised by selectively controlling the pressure of hydraulic fluid in the cylinders 52. Although torque is applied to the actuator shaft 50, which is connected to (in this example) the high-speed shaft 32 of the first gearbox 20, the closed-loop mechanical circuit transmits the applied torque to the high-speed shaft 36 of the second gearbox 22 via the first coupler 2 and the first and second gearboxes 20, 22. Relative to the low-speed, high-torque rotation conferred by the drive motor 24, the hydraulic rotary actuator 46 confers a high-speed, low-torque rotation on the high-speed shafts 32, 36.

The hydraulic rotary actuator 46 may be required to resist the rotation conferred by the drive motor (and by the positive feedback provided by the closed loop mechanical circuit) on the high-speed shafts 32, 36 (for example to simulate the back electromagnetic force of an electric generator or even a bird strike on the wind turbine blades) or to assist the rotation conferred on the high-speed shafts 32, 36 (for example, to simulate the effects of a strong gust of wind). The hydraulic rotary actuator 46 may thus need to be capable of conferring both clockwise and anticlockwise torques (that is, the hydraulic rotary actuator may need to be capable of conferring torques in each of two opposing rotational directions about a common axis of rotation) on the high-speed shaft 32. As explained above, the radial piston hydraulic rotary actuator 46 is capable of doing this.

As the gearboxes 20, 22 are arranged symmetrically (back-to-back), when the high-speed shaft 32 of the first gearbox 20 is rotated clockwise, the high-speed shaft 36 of the second gearbox 22 is rotated anticlockwise. However, it will be understood that the closed-loop mechanical circuit is also configured such that the hydraulic rotary actuator 46 applies opposite torques to the shafts 32, 36. Accordingly, the actuator 46 typically applies either a resistive torque (i.e. a torque which opposes rotation conferred on the high-speed shafts 32, 36 by the drive motor 24) or an assistive torque (i.e. a torque provided in the same rotational direction as the rotation conferred on the high-speed shafts 32, 36 by the drive motor 24) to both shafts 32, 36.

When the high-speed shafts 32, 36 of the (matched) first and second gearboxes 20, 22 rotate at substantially the same rate, it is desirable for the actuator casing 48 (coupled to the high-speed shaft 36 of the second gearbox 22) of the hydraulic rotary actuator 46 to rotate at the same rate as the actuator shaft 50 (connected to the high-speed shaft 32 of the first gearbox 20) of the hydraulic rotary actuator 46. This helps to optimise the efficiency with which energy is recycled within the closed-loop mechanical circuit. In this case, a desired regulating torque can be applied by stalling the actuator 46. Thus, when the gearboxes are matched, energy can be efficiently recycled (purely mechanically in the illustrated embodiment) in the closed-loop mechanical circuit and a minimum actuator power is required from the hydraulic rotary actuator 46. Nevertheless, it will be understood that there will be some continuous power consumption to maintain hydraulic pressure of the hydraulic fluid and apply the desired torque.

When the first and second gearboxes 20, 22 are not matched, the high-speed shaft 32 of the first gearbox 20 is driven at a different rate of rotation by the drive motor 24 than the high-speed shaft 36 of the second gearbox 22. Because the high-speed shaft 32 of the first gearbox 20 is connected to the actuator shaft 50 and the high-speed shaft 36 of the second gearbox 22 is coupled to the actuator casing 48, the actuator shaft 50 may need to rotate relative to the actuator casing 48 about an axis of rotation to accommodate the different rates of rotation of the high-speed shafts 32, 36. This relative rotation of the actuator casing 48 and the actuator shaft 50 is known as "slippage".

To accommodate the high-speed shaft 32 of the first gearbox 20 rotating faster than the high-speed shaft 36 of the second gearbox 22, the actuator shaft 50 may need to rotate at a faster rate than the actuator casing 48. This can be achieved by driving the actuator shaft 50 to rotate at a faster rate (in the same rotational direction) than the casing 48 by regulating the pressure of the hydraulic fluid in the cylinders 52 appropriately. As described above, when the hydraulic rotary actuator 46 is a radial piston rotary actuator, this may be achieved by driving pistons 51 in an appropriate sequence with appropriately pressurised fluid from the hydraulic power unit to obtain the required direction and rate of rotation. This allows the high-speed shaft 32 of the first gearbox 20 to rotate at a faster rate than the high-speed shaft 36 of the second gearbox 22 as required. Additional power is required from the actuator 46 to rotate the actuator shaft 50 relative to the actuator casing 48, on top of the actuator power required to regulate the torque being applied to the high-speed shafts 32, 36, because more pressurised hydraulic fluid must be fed to the cylinders 52 from the hydraulic power unit.

On the other hand, when the high-speed shaft 36 of the second gearbox 22 rotates at a faster rate than the high-speed shaft 32 of the first gearbox 20, the actuator shaft 50 must rotate at a slower rate than the actuator casing 48. This can be achieved by operating the hydraulic rotary actuator 46 as a pump. In this case, the actuator is configured so that the shaft 50 pumps pressurised hydraulic fluid from the cylinders 52 back into the hydraulic circuit (through pressure relief valves provided in the cylinders 52) as it rotates. By making the shaft 50 do work, in the form of pumping hydraulic fluid from the cylinders, the shaft 50 is made to rotate at a slower rate than (but in the same rotational direction as) the casing 48. This allows the high-speed shaft 32 of the first gearbox 20 to rotate at a slower rate than the high-speed shaft 36 of the second gearbox 22 as required.

It will be understood that when the gearing ratios of the first and second gearboxes 20, 22 are not matched, the greater the required rate of rotation of the high-speed shaft 32 of the first gearbox 20, the greater the discrepancy between the required rates of rotation of the actuator shaft 50 and the actuator casing 48. Thus, when the actuator shaft 50 is required to rotate at a higher rate than the casing 48, the greater the required rate of rotation of the high-speed shaft 32 of the first gearbox 20 during testing, the greater the power required from the actuator 46 to regulate the overall torque applied to the actuator shaft 50.

Figure 6:
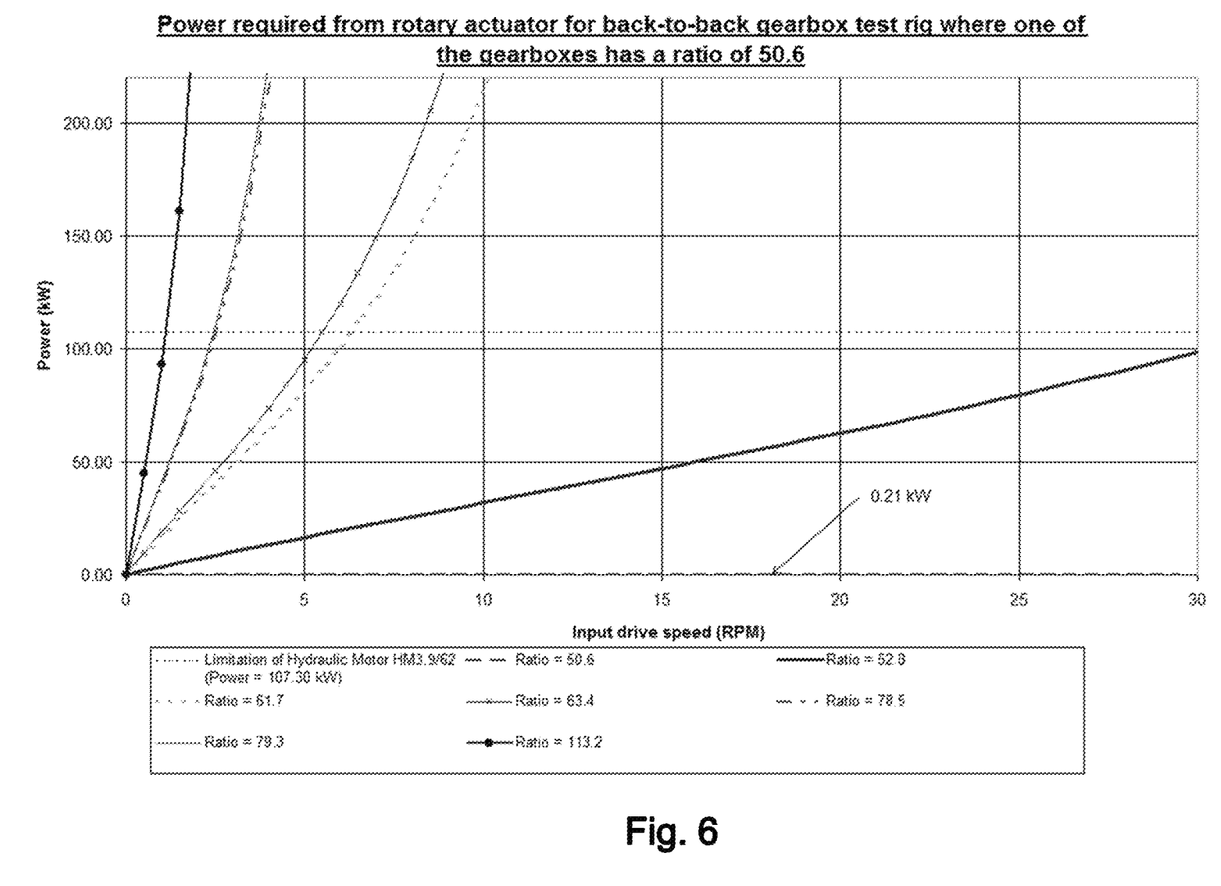
FIG. 6 is an exemplary graph of required actuator power versus input drive speed for the gearbox test rig of FIG. 1 showing the power required from the actuator when the gearboxes have different gearing ratios compared to when the gearboxes have matched gearing ratios.

FIG. 6 is an exemplary plot of the power required from actuator 46 versus input drive speed (input drive speed being a function of the required speed of rotation of the high-speed shaft 32). In the examples illustrated in FIG. 6, the second gearbox 22 always has a gearing ratio of 50.6, while the gearing ratio of the first gearbox 20 is varied. The maximum actuator power is 107.3 kW. When the gearing ratios of the first and second gearboxes are identical, the same relatively low actuator power (0.21 kW) is required regardless of the input drive speed. This is because energy is efficiently recycled in the closed-loop mechanical circuit, and no additional energy is required from the actuator to overcome any speed differences by the actuator shaft 50 and the actuator casing 48. However, as the gearing ratio of the first gearbox 20 increases relative to that of the second gearbox 22, the required actuator power increases significantly with input drive speed. For example, when the gearing ratio of the first gearbox is 113.2, the power required from the actuator 46 increases beyond its 107.3 kW limit when the input drive speed is only 1 or 2 revolutions per minute.

In order to overcome this limitation, additional gearing may be employed between the high-speed shaft 32 of the first gearbox 20 and the actuator shaft 50 of the hydraulic rotary actuator 46 so that the high-speed shafts 32, 36 coupled to the actuator shaft 50 and the actuator casing 48 of the actuator 46 respectively are provided with similar rates of rotation, thereby decreasing the power required from the actuator 46. Additionally, or alternatively, additional gearing may be provided between the high-speed shaft 36 of the second gearbox 22 and the actuator casing 48 of the actuator 46.

It will be understood that the rotational directions of the high-speed shafts 32, 36 relative to the actuator shaft 50 and casing 48 respectively may depend on what gearing (if any) is coupled between the actuator 46 and the high-speed shafts 32, 36. For example, gearing may be coupled between the high-speed shaft 32 of the first gearbox 20 and the actuator shaft 50 which causes the actuator shaft 50 to rotate in the opposite rotational sense to (or alternatively the same rotational sense as) the high-speed shaft 32 of the first gearbox 20. Similarly, gearing may be coupled between the actuator casing 48 and the high-speed shaft 36 of the second gearbox 22 which causes the actuator casing 48 to rotate in the opposite rotational sense to (or alternatively the same rotational sense as) the high-speed shaft 36 of the second gearbox 22.

It will also be understood that, when the actuator 46 is operated as a pump (i.e. when the actuator shaft 50 is required to rotate at a slower rate than the casing 48), the greater the discrepancy between the required rates of rotation of the actuator shaft 50 and the actuator casing 48, the more pressurised hydraulic fluid is output from the actuator 46.

Regulating the torque at the high-speed side is more desirable than at the low-speed side, particularly where space is restricted in a typical testing environment, because lower torques need to be applied. Low torque machines take up less physical space and are more economical than high torque machines. In addition, as the hydraulic rotary actuator 46 provides an effective means for applying transient torques, no additional equipment is required to apply transients to the gearbox(es) during testing.

Figure 5:
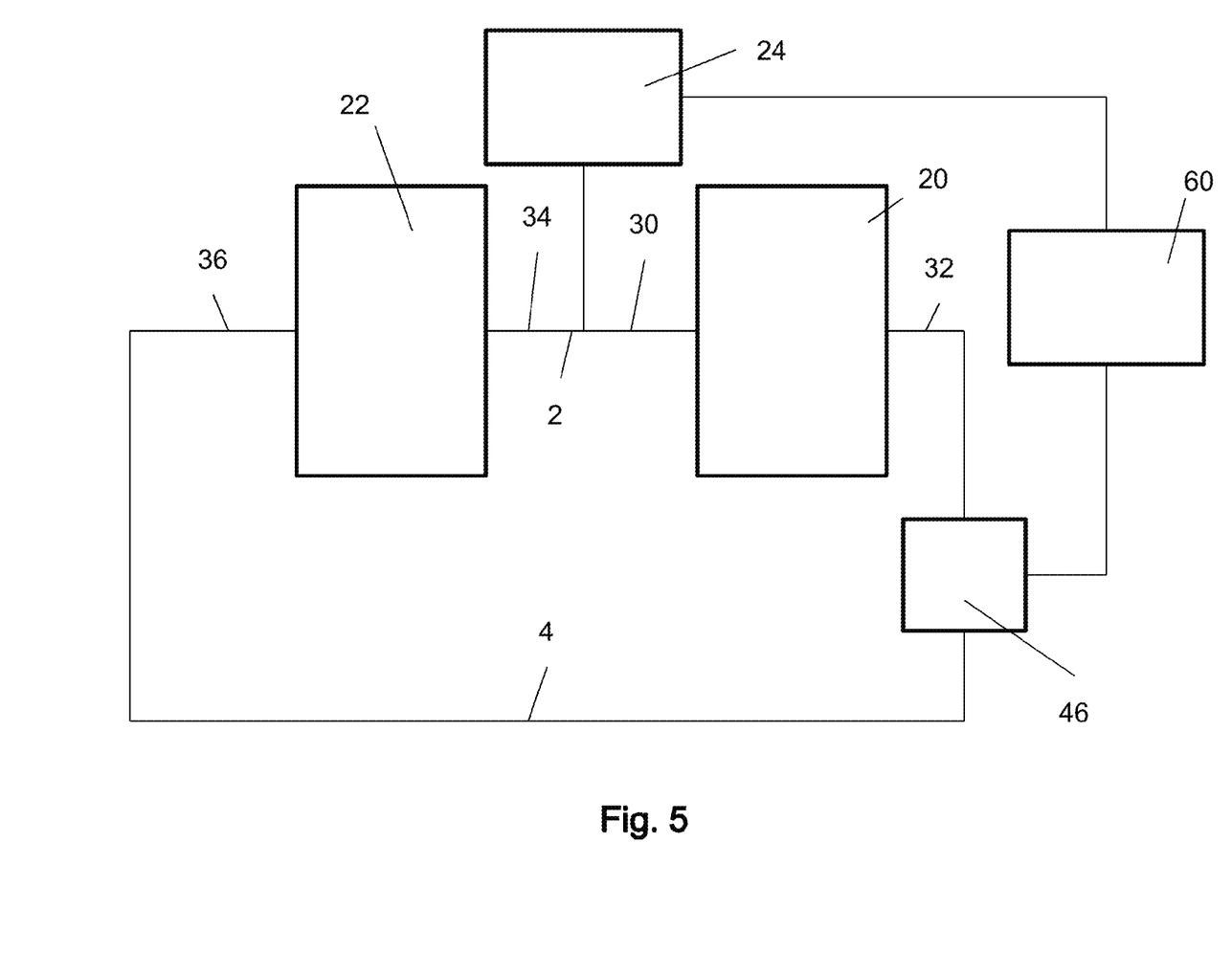
FIG. 5 is a block diagram illustrating the closed-loop mechanical circuit of the gearbox test rig of FIG. 1.

As illustrated in the block diagram of FIG. 5, a PC-based controller 60 is typically provided to send and receive control signals to and from the drive motor 24, the hydraulic rotary actuator 46 and the hydraulic power unit, typically via an electronic connection, to control the torque applied to the closed-loop mechanical circuit. The PC-based controller may be provided with an interface terminal box (not shown) to provide an interface between the PC and the motor 24 and actuator 46.

Preferably, the PC-based control system integrates control of the hydraulic power unit, rotary actuator 46 and drive motor 24 such that they can be controlled from a single operation control screen visible to an operator.

One or more torque sensors may be provided to measure the torque being applied to the high-speed shaft 32 of the first gearbox 20. This measurement may be fed back to the PC-based controller 60 to enable the controller 60 to regulate the torque being applied by the hydraulic rotary actuator 46. In this way, the controller may be configured to apply a constant torque to the high-speed shaft 32 of the first gearbox 20. Alternatively, the PC-based controller 60 may be configured to apply transient torques to the high-speed shaft 32 of the first gearbox 20 according to one or more predefined torque patterns. For example, the controller 60 may be configured to apply a transient torque which simulates a sudden gust of wind incident on wind turbine blades; alternatively, the transient torque may simulate a bird strike on the turbine blades or the reduction in speed of rotation of the wind turbine blades passing the tower. In one embodiment, the controller may provide two modes: constant torque mode where the torque applied to the high-speed shaft 32 of the first gearbox 20 is constant; and transient torque mode where one or more transient torques are applied. The controller 60 may, of course, toggle between modes during testing.

A Programmable Logic Controller (PLC) unit may be provided in place of the PC-based controller. However, the PC-based controller is preferred due to the ease with which additional test routines or features can be added. The PC interface may also be more intuitive for a number of user groups.

In addition to controlling the desired speed and torque of operation of the gearbox test rig 1, the control system typically contains measurement routines to record test data automatically during testing. The control system may also guide the operator through the required test procedure. With additional equipment, such as a pump and an oil cleanliness sensor for passing gearbox oil through a sensing loop via appropriate pipework, this test procedure could include obtaining recordings of oil cleanliness which may be captured and stored by a data recorder. As lubrication systems on gearboxes vary, it may be necessary to provide unique solutions for each gearbox type.

It will be understood that neither the actuator casing 48 nor the actuator shaft 50 needs to be cylindrical, and that they may have any appropriate shape.

The hydraulic power unit may be spaced from the gearbox test rig 1 (or even provided in a separate room from the gearbox test rig 1) in order to minimise the noise added by the hydraulic actuator 46. This allows the noise generated by the gearboxes 20, 22 to be measured without significant interference from the actuator 46 and optionally the drive motor 24. Such noise measurements can be made by accelerometers and microphones connected the controller 60 and suitably positioned adjacent the gearboxes 20, 22. The accelerometers would need to be connected to each individual gearbox 20, 22. Optionally, the measurement data captured by the microphones/accelerometers may be fed back to the controller 60 for recording.

Further modifications and variations may be made within the scope of the invention herein disclosed.

The invention claimed is:

1. A gearbox test rig for testing first and/or second gearboxes having power ratings of 1 MW or more, the gearbox test rig comprising: a first coupler for coupling a low-speed shaft of a first gearbox to a low-speed shaft of a second gearbox such that forces can be transmitted between the low-speed shafts of the first and second gearboxes; and a second coupler for coupling a high-speed shaft of the first gearbox to a high-speed shaft of the second gearbox such that forces can be transmitted between the high-speed shafts of the first and second gearboxes, wherein the second coupler comprises a hydraulic rotary actuator for regulating a torque which is applied to the high-speed shafts of the first and second gearboxes.

2. A gearbox test rig according to claim 1, wherein the hydraulic rotary actuator comprises first and second members which are rotatable relative to each other, each member being couplable or coupled to a high-speed shaft of a respective one of the first and second gearboxes.

3. A gearbox test rig according to claim 2, wherein the first member comprises an actuator shaft provided within an actuator casing.

4. A gearbox test rig according to claim 3, wherein the second member comprises the actuator casing.

5. A gearbox test rig according to claim 1, further comprising one or more torque sensors for measuring the torque being applied to one or more of the shafts of the first and/or second gearboxes.

6. A gearbox test rig according to claim 1, further comprising a controller for controlling the torque applied to the high speed shafts of the first and second gearboxes by the hydraulic rotary actuator.

7. A gearbox test rig according to claim 1, further comprising:
one or more torque sensors for measuring the torque being applied to one or more of the shafts of the first and/or second gearboxes;
a controller for controlling the torque applied to the high speed shafts of the first and second gearboxes by the hydraulic rotary actuator;
wherein the one or more torque sensors are coupled to the controller.

8. A gearbox test rig according to claim 7, wherein the controller has a first operating mode wherein it is capable of controlling the hydraulic rotary actuator to apply a substantially constant torque to the high-speed shafts of the first and second gearboxes.

9. A gearbox test rig according to claim 1, wherein the controller has a second operating mode whereby it is capable of controlling the hydraulic rotary actuator to apply one or more transient torques to the high-speed shafts of the first and second gearboxes.

10. A gearbox test rig according to claim 1, further comprising one or more gears couplable or coupled between the high-speed shaft of the first gearbox and the hydraulic rotary actuator and/or one or more gears couplable or coupled between the high-speed shaft of the second gearbox and the hydraulic rotary actuator.

11. A gearbox test rig according to claim 1, further comprising a drive motor coupled to the first coupler such that forces can be transmitted from the drive motor to the low-speed shafts of the first and second gearboxes.

12. A gearbox test rig according to claim 11 wherein the drive motor is hydraulically powered.

13. A gearbox test rig according to claim 11, wherein the drive motor is coupled to the first coupler by one or more drive gears.

14. A gearbox test rig according to claim 1, wherein the first coupler comprises a mechanical coupler.

15. A gearbox test rig according to claim 1, wherein the first coupler comprises a hydraulic coupler.

16. A gearbox test rig according to claim 1, wherein the second coupler comprises a drive belt.

17. A gearbox test rig according to claim 1, wherein the second coupler comprises first and second drive belts.

18. A gearbox test rig according to claim 16, wherein a first drive belt couples the hydraulic rotary actuator to a rotatable mechanical shaft.

19. A gearbox test rig according to claim 17 wherein a second drive belt couples the high speed shaft of the first or second gearbox to a rotatable mechanical shaft.

20. A gearbox test rig according to claim 1, wherein the hydraulic rotary actuator is capable of providing torques in each of two opposing rotational directions about a common axis of rotation.

21. A gearbox test rig according to claim 1 wherein the hydraulic rotary actuator is a radial piston hydraulic rotary actuator.

22. A method of testing first and/or second gearboxes having power ratings of 1 MW or more, the method comprising: coupling a low-speed shaft of a first gearbox to a low-speed shaft of a second gearbox by a first coupler; coupling a high-speed shaft of a first gearbox to a high-speed shaft of a second gearbox by a second coupler, the second coupler comprising a hydraulic rotary actuator; transmitting forces between the low-speed shafts of the first and second gearboxes by the first coupler; transmitting forces between the high-speed shafts of the first and second gearboxes by the second coupler; and controlling the hydraulic rotary actuator to regulate a torque which is applied to the high-speed shafts of the first and second gearboxes.

23. A method according to claim 22, further comprising performing one or more tests on the first and/or second gearboxes.

24. A method according to claim 22 wherein the hydraulic rotary actuator comprises first and second members, the first member being rotatable relative to the second member, the method further comprising coupling the high-speed shaft of one of the first and second gearboxes to the first member and coupling the high-speed shaft of the other of the first and second gearboxes to the second member.

25. A method according to claim 24 wherein the first member is an actuator shaft of the hydraulic rotary actuator.

26. A method according to claim 24 wherein the second member is a casing of the hydraulic rotary actuator.

27. A method according to claim 24 further comprising rotating the first member relative to the second member.

28. A method according to claim 22, further comprising controlling the hydraulic rotary actuator to apply a substantially constant torque to the high-speed shafts of the first and second gearboxes.

29. A method according to claim 22, further comprising controlling the hydraulic rotary actuator to apply one or more transient torques to the high-speed shafts of the first and second gearboxes.

30. A method according to claim 22, further comprising coupling the high speed shaft(s) of the first and/or second gearboxes to the hydraulic rotary actuator via one or more gears.

31. A method according to claim 22, further comprising transmitting a torque from a drive motor to the low-speed shafts of the first and second gearboxes via the first coupler.

32. A method according to claim 31, wherein the drive motor is hydraulically powered.

33. A method according to claim 22, wherein the first coupler comprises a hydraulic coupler.

34. A method of claim 22, wherein the second coupler comprises one or more drive belts, the method further comprising transmitting forces between the high-speed shafts of the first and second gearboxes via the one or more drive belts.

* * * * *